2,780,457

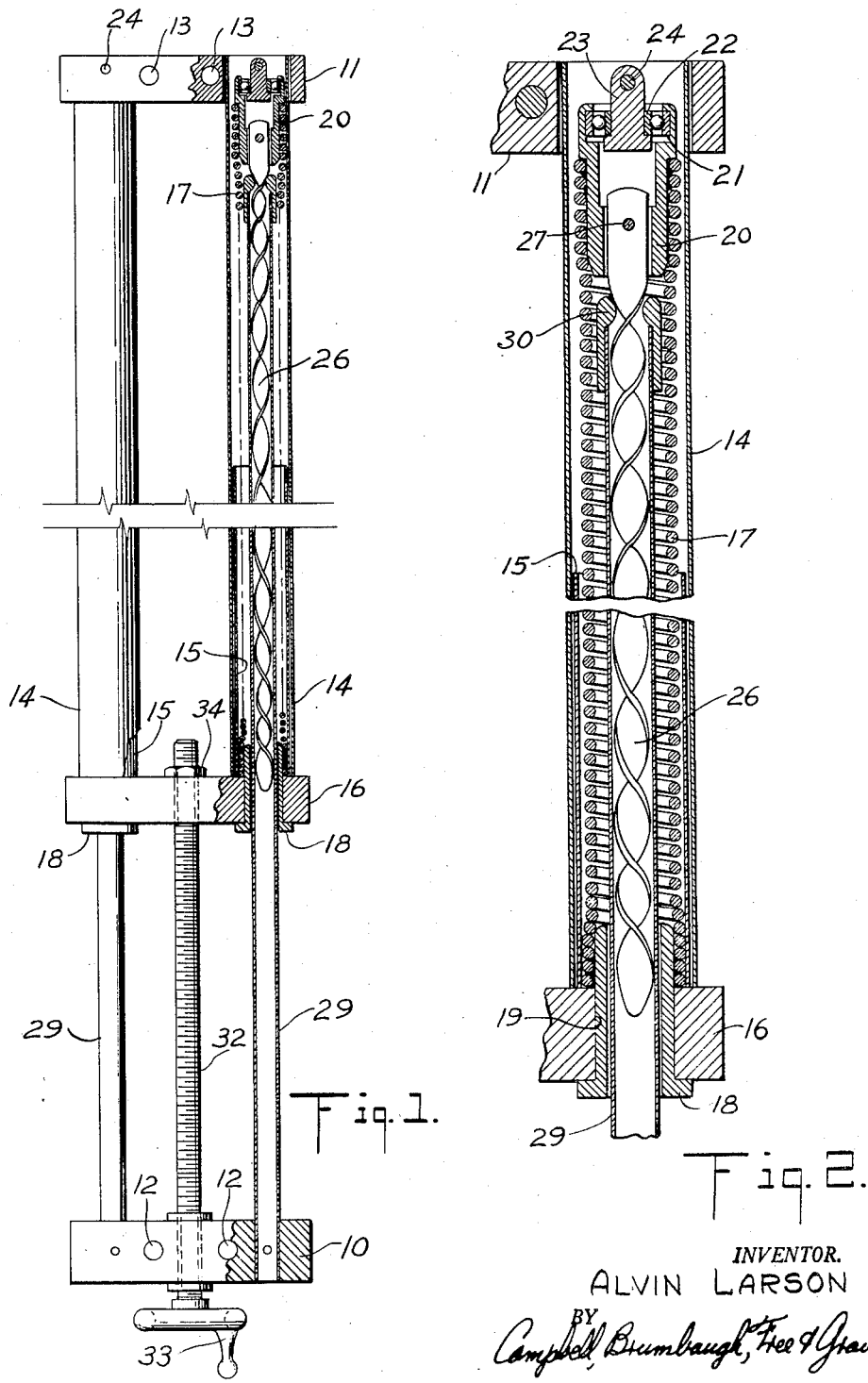

ADJUSTABLE LOAD CARRYING DEVICE

Alvin Larson, Stamford, Conn., assignor to Unique Balance Co., Inc., New York, N. Y., a corporation of Illinois Application August 11, 1953, Serial No. 373,571

6 Claims. (Cl. 267—1)

The present invention relates to extensible spring balances, and, more particularly, to novel and improved apparatus for varying the load carrying capacity of extensible spring balances.

Extensible spring balances have found a wide variety of use in controlling the relative movement between two interrelated elements, for example, slidable window sashes and window frames, overhead garage doors, and camera with movable bellows. One of the known types of extensible spring balances utilizes a helically wound spring which is adapted to be placed in tension. One end of the helically wound spring is usually fixedly attached to one of the two elements between which controlled relative movement is desired. The other end of the helically wound spring is usually rotatably attached to the other member, in such a manner as to permit variation in the torsional force within the helical spring. This variation of the torsional force is usually accomplished by a control device connected between the rotatable mounting at one end of the helically wound spring and the member to be moved relative thereto. Such a torsional control device may include a spiral flat metal strip adapted to be passed through a slot or keyway in a nut which is connected to the other member. Extensible spring balances of this type have an important disadvantage, in that they must be designed or preset upon assembly for controlling the movement of a load having a predetermined weight. It has been found that, when using extensible spring balances of this type for loads of different sizes, a true balance cannot be effected for each one of the individual loads.

It is, accordingly, an object of the invention to provide novel and improved apparatus of the type described which is not subject to the aforementioned disadvantages.

Another object of the invention is to provide novel and improved apparatus for adjusting the tension in extensible spring balances to accommodate substantial variations in load size.

These and other objects of the invention will become apparent from a study of the following detailed description taken in conjunction with the accompanying figures of the drawing, in which:

Fig. 1 is a longitudinal view, partly in section, of an adjustable, extensible spring balance, in accordance with the invention; and Fig. 2 is an enlarged sectional view of a portion of the apparatus shown in Fig. 1.

In Fig. 1, there are shown two supporting bars 10 and 11, which may be attached by suitable means, for example, by means of the holes 12 and 13, respectively, to the two elements between which relative movement is desired. For the purposes of illustration, it will be assumed that the bar 11 is attached to some fixed support from which the apparatus depends. The load may be attached to the bar 10 and may be an object of definite weight requiring a constant sum of forces at all points of its vertical travel to maintain the system in balance.

The device may comprise two side-by-side identical units connected between the supporting bars 10 and 11, each including a pair of telescoping tubes 14 and 15 mounted between the supporting bar 11 and a tension adjustment bar 16. The device is shown in its fully condensed position and is supporting the load at its highest point of operation. Since the units are identical, the following detailed discussion will be directed to only one of the units, it being understood that the remarks are equally applicable to the other unit.

The outer tube 14 may be attached to the support bar 11, while the inner tube 15 may be attached to the tension adjustment bar 16. A helically wound spring 17 may be disposed within the telescoping tubes 14 and 15. One end of the spring 17 may be fixedly mounted on a bushing 18 extending through a hole 19 in the tension adjustment bar 16. The upper end of the spring 17 may be mounted around a rotatable bushing 20. The rotatable bushing 20 may include a suitable bearing, for example a conventional thrust and radial type ball-bearing having an outer race 21 fitted to rotate with the rotatable bushing 20 and an inner race 22 which may be fastened to a shouldered stud 23. The shouldered stud 23 may be fixed non-rotatably to the support bar 11 by means of a pin 24, which also may serve to hold the outer tube 14 to the support bar 11.

A twisted spiral member 26 may be disposed inside the helical spring 17 and have one end thereof fastened by means of a pin 27 to the rotatable bushing 20. The twisted spiral member 26 may be adapted to slide within an elongated tube 29, which may be connected by means of a pin connection to the support bar 10 and may extend slidably through the bushing 18 and the interior of the helical spring 17. The end of the tube 29, which is adapted to receive the twisted spiral member 26, may have a slotted nut 30 non-rotatably fixed thereto. The slotted nut 30 may be of suitable material for acting upon the twisted spiral member 26.

The relative positions of the tension adjustment bar 16 and the support bar 10 may be altered by the adjustment of a conventional adjusting screw 32 connected therebetween. The adjusting screw 32 may be rotated by means of a handwheel 33 and locked in position by a locknut 34 when the tension adjustment bar 16 is spaced a selected distance from the support bar 10.

From the above description of the working parts of the device, it can be seen that the load is actually supported by two forces through two mechanical channels in each of the units. The direct force resulting from extending the spring 17 gives a direct non-frictional lift to the load through its connection from the spring 17 through the bushing 18, the tension adjustment bar 16, and the adjusting screw 32 to the support bar 10. The other force is the resultant reaction of torsion supplied by an initial number of turns applied to the spring 17 during assembly of the device plus the additional torsional force resulting from the turns or twists of the spiral member 26, as the load is lowered from its highest position.

As the load is lowered from its highest position, it can be seen that the force resulting from the elongation of the spring 17 will increase and this force would then support an increasing load equal to the increase of the tension. Since this would not create a state of equilibrium for a constant load as desired, the resultant force of the torsion of the spring must decrease at the same rate that the tension from elongation increases. This is accomplished by changing the angle of helix on the spiral member 26 to provide a variable pitch in the spiral member 26 along its entire length. The greater the pitch of the spiral member, the less lift is given to the slotted nut 30 and the tube 29 from the torsional force of the spring 17.

If the angle of helix relative to the axis of the spiral member 26 is decreased and made to approach 0°, the lift resulting from the torsion of the spring 26 will also decrease and will be zero when the angle is 0°. If this reasoning is carried further, it will be seen that if the angle of helix relative to the axis is changed beyond 0°, an opposite hand of twist will occur and the resultant force from the torsion of the spring 26 will be negative and thus work against the force resulting from the tension of the spring 17.

In an effort to more clearly describe the invention, reference is made to the following table:

Table A

[Initial tension of spring=10 lbs. Tension adjustment bar at light load.]

| Portion of Travel of Load | Lift from Tension, pounds | Required Lift from Torsion, pounds | Total Lift or Load, pounds |
|---|---|---|---|
| High Point | 10 | 10 | 20 |
| ¼ Down | 15 | 5 | 20 |
| ½ Down | 20 | 0 | 20 |
| ¾ Down | 25 | −5 | 20 |
| Low Point | 30 | −10 | 20 |

Table A is an example of a possible condition of operation for the exemplary embodiment disclosed. The first column represents the position of the load at different portions of the required travel. No linear dimensions are given as we are mainly interested in the functions of the device as far as relative forces are concerned. The initial tension of the spring 17 is 10 lbs. (i. e., the force required to part the turns or to elongate the spring from its closed length). In order to carry the required load, it is therefore necessary to apply sufficient turns in the spring 17, during asembly, to give a resultant lift to the slotted nut 30 through the spiral member 26 equal to 10 lbs., so as to balance a predetermined load of 20 lbs.

The pitch of the twisted spiral rod 26 must be of the proper helix angle at its uppermost point to convert the rotary torsion force into a linear force to obtain the required lift.

As the load is lowered from its highest point, the tension of the spring 17 increases until such a position is reached that the tension equals the entire full load (in this instance, ½ down). At this point, the required lift from torsion is 0 lb., therefore, the portion of the spiral member 26 which is engaged with the slotted nut 30 would be flat and parallel with the axis of the spiral member 26. In other words, a helix angle of 0° relative to the axis of the spiral member 26 is found to provide a required lift from torsional force of 0 lb.

As the load is lowered to the lowest point of travel, the tension of the spring 17 increases to 30 lbs. thus requiring a negative force of −10 lbs. to balance a load of 20 lbs. This negative force is obtained by using a twist of opposite direction or hand on the lower end of the twisted spiral member 26. Thus, the reaction from torsion is a force downwards instead of a lift. The total force of tension and reaction from torsion still totals 20 lbs. (i. e., equivalent to the desired load) and is in equilibrium with the load at all points of the travel.

The load carrying capabilities of this device may be varied in the following manner. Let us assume that a greater load is to be carried than is possible with the tension adjustment bar 16 in a position which would be satisfactory for balancing a light load, as shown in Table A. In order to adjust for the greater load the handwheel 33 is operated so as to cause the adjusting screw 32 to draw the tension adjustment bar 16 towards the load supporting bar 10, without changing the relative positions of support bars 10 and 11. Thus, the springs 17 are stretched and their tension is increased. The following table shows such a situation.

Table B

[Initial tension of spring=10 lbs. Tension adjustment bar at medium load.]

| Portion of Travel of Load | Lift From Tension | Required Lift From Torsion, lbs. | Total Lift Or Load, lbs. |
|---|---|---|---|
| High Point | 10 lbs. + 5 lbs. | 10 | 25 |
| ¼ Down | 15 lbs. + 5 lbs. | 5 | 25 |
| ½ Down | 20 lbs. + 5 lbs. | 0 | 25 |
| ¾ Down | 25 lbs. + 5 lbs. | −5 | 25 |
| Low Point | 30 lbs. + 5 lbs. | −10 | 25 |

Let us assume that the tension adjustment bar 16 is set for a "medium load" as in Table B, where the tension of the spring 17 has been increased by 5 lbs. It will be obvious that this increase in tension of the spring 17 is accomplished without any actual elongation of the device or lowering of the load's position.

With the load at the "high point," the lift from tension has been increased by 5 lbs. by increasing the tension of the spring 17 (by elongation) without a movement of the load. This increase in tension increases the lift from tension a constant 5 lbs. at any point at which the load may be positioned in its vertical travel, assuming linearity in the response of the spring. As there is no change in the lift from torsion, the 5 lb. increases are reflected in the increased total lift or load. Thus, the device will now balance 25 lbs. with the tension adjustment bar placed at the "medium load" position.

Table C

[Initial tension of spring=10 lbs. Tension adjustment bar at heavy load.]

| Portion of Travel of Load | Lift From Tension | Required Lift From Torsion, lbs. | Total Lift Or Load, lbs. |
|---|---|---|---|
| High Point | 10 lbs. + 10 lbs. | 10 | 30 |
| ¼ Down | 15 lbs. + 10 lbs. | 5 | 30 |
| ½ Down | 20 lbs. + 10 lbs. | 0 | 30 |
| ¾ Down | 25 lbs. + 10 lbs. | −5 | 30 |
| Low Point | 30 lbs. + 10 lbs. | −10 | 30 |

Table C represents a further adjustment of the tension adjustment bar 16 in order to accommodate a "heavy load." In this example, the tension of the spring 17 has been increased another 5 lbs., thereby permitting the device to balance a load of 30 lbs.

Therefore, in accordance with the invention, there has been provided a novel and improved apparatus which operates to give a true balance, as well as being adjustable for different loads. Even though this particular set of figures gives a range of from 20 to 30 lbs. per spring or unit, it will be obvious that such a range is very conservative for a device of this type.

Since the adjustment for different loads is accomplished by elongation of the spring 17, it can be readily seen that the required lift from torsion at any portion of the travel of the load is constant relative to that portion of the travel, regardless of the position of the tension adjustment bar. Therefore, the complete adjustment of the weight carrying capacity of the device is entirely dependent upon the amount of stretch or elongation of the spring 17 and is independent of the position of the slotted nut 30 on the spiral member 26. Thus, a true balance is produced at any portion of the travel of the load regardless of the position of the tension adjustment bar 16.

It will be obvious to those skilled in the art that the above embodiment is meant to be merely exemplary and that it is susceptible of modification and variation without departing from the spirit and scope of the invention. For example, the values of tension, loads, etc., given in the three tables are purely hypothetical and will vary according to the characteristics of the spring 17 and the load requirements. The spring 17 may take the form of round wire shown in the drawings, or any other type of cross section which may be required for any particular application to give the improved characteristics.

The spiral member 26 may be twisted in any of several ways in order to arrive at the required sum of forces, i. e., it may have its entire length twisted in one direction only, or it may have a reversal of twist at any point along its length or on an imaginary extension of the twisted strip.

Further, while the above embodiment is directed to the balancing of a load consisting of an object of a definite weight, it will be obvious that the device is capable of delivering a non-uniform sum of forces, such as required for the lifting of an overhead garage door where the load would become less as the door was lifted.

While the exemplary embodiment shows two units in side by side relation, it will be understood that the units may be arranged in any suitable multiple fashion to satisfy any type of load requirement. On the other hand, a single unit may be found to be most desirable.

Accordingly, the invention is deemed to be limited only by the appended claims.

I claim:

1. An extensible spring balance for the support of a movable member relative to a fixed member, comprising a straight tube having a slotted opening at one end thereof connected to one of said members, an elongated spiral member having convolutions of varying pitch along the length thereof connected to the other of said members, said spiral member adapted to be engaged by said slotted opening and rotated upon its axis during relative endwise movement of said tube and said spiral member, an extensible torsion spring enclosing at least a portion of said spiral member and said tube and having one end connected to said spiral member so as to rotate with said spiral member, spring mounting means to which the other end of the extensible spring is attached, said spring mounting means being supported by the one of said members to which the straight tube is attached, and means for adjustably displacing the position of said spring mounting means relative to the one of said members to which the straight tube is attached to facilitate varying the longitudinal extension of the extensible spring.

2. An extensible spring balance for controlling the relative movement of two interrelated members, comprising a straight tube having one end thereof non-rotatably attached to one of the members, means forming a slotted opening at the other end of said tube, an elongated spiral member having one end thereof rotatably mounted on the other interrelated member and the other end thereof adapted to be engaged by said slotted opening, said spiral member having convolutions of varying pitch along the length thereof which coact with said slotted opening to rotate said spiral member upon its axis, an extensible spring member enclosing at least a portion of said tube and said spiral member and having one end thereof connected with said spiral member for rotation therewith, means for non-rotatably mounting the other end of said extensible spring member, and means for adjustably displacing said mounting means for the other end of the spring relative to the one of said interrelated members to which the tube is attached for varying the longitudinal extension of said spring member.

3. An extensible spring balance for controlling the relative movement of two interrelated members, comprising a straight tube having one end thereof non-rotatably attached to one of the two interrelated members, means forming a slotted opening at the other end of said tube, an elongated spiral member having one end thereof rotatably mounted on the other interrelated member and the other end thereof adapted to be engaged by said slotted opening, said spiral member having convolutions of varying pitch along the length thereof which coact with said slotted opening to rotate said spiral member upon its axis, an extensible spring member enclosing at least a portion of said tube and said spiral member and having one end thereof connected with said spiral member for rotation therewith, means for non-rotatably mounting the other end of said extensible spring member at a point intermediate said two interrelated members, and means for varying the spacing between said non-rotatably mounted end of said spring member and said one of the two interrelated members.

4. An extensible spring balance for controlling the relative movement of two interrelated members, comprising a straight tube having one end thereof non-rotatably attached to one of the two interrelated members, means forming a slotted opening at the other end of said tube, an elongated spiral member having one end thereof rotatably mounted on the other interrelated member and the other end thereof adapted to be engaged by said slotted opening, said spiral member having convolutions of varying pitch along the length thereof which coact with said slotted opening to rotate said spiral member upon its axis, an extensible spring member enclosing at least a portion of said tube and said spiral member and having one end thereof connected with said spiral member for rotation therewith, and a tension adjusting means supported by and adjustably displaceable with respect to the one of said interrelated members to which the straight tube is non-rotatably attached, the other end of said extensible spring member being non-rotatably attached to said tension adjusting means, said tension adjusting means being operable to vary the spacing between said non-rotatably mounted end of said extensible spring member and said one of said two interrelated members.

5. An extensible spring balance for controlling the relative movement of two interrelated members, comprising a straight tube having one end thereof non-rotatably attached to one of the members and means forming a slotted opening at the other end of said tube, an elongated spiral member having one end thereof rotatably mounted on the other interrelated member and the other end thereof adapted to be engaged by said slotted opening, said spiral member having convolutions of varying pitch along the length thereof which coact with said slotted opening to rotate said spiral member upon its axis, an extensible spring member enclosing at least a portion of said tube and said spiral member and having one end thereof connected with said spiral member for rotation therewith, a tension adjusting member having an opening therein adapted to slidably receive said straight tube at a point intermediate said two interrelated members, the other end of said extensible spring member being non-rotatably attached to said tension adjusting member and adjustable means for varying the spacing between said tension adjusting member and said one of said two interrelated members.

6. An extensible spring balance for connecting a pair of members, one of which is hung from the other for movement toward and away from the other, comprising a spiral element connected to one of said pairs of members, a slotted element in engagement with the spiral member, said slotted element being connected to the other of said pairs of members, one of said elements being mounted to its respective member for rotation about its axis and the other of said elements being fixedly mounted to its respective member, the spiral element and the slotted element being movable relative to each other in an axial direction, whereby one is rotatable about the axis and the other is fixed, an extensible torsion spring surrounding the spiral member, a spring mounting supported by the one of said pairs of members to which the fixed element is mounted, one end of the extensible spring being attached to the rotatable element and the other end being attached to said spring mounting, and means for adjustably displacing the spring mounting relative to the one of said pairs of members to which the fixed element is mounted to vary the length of the spring without winding or unwinding the spring.

References Cited in the file of this patent

UNITED STATES PATENTS

| | | |
|---|---|---|
| 367,020 | Barlow | July 26, 1887 |
| 978,026 | Jaenichen | Dec. 6, 1910 |
| 2,622,267 | Peremi | Dec. 23, 1952 |